(12) United States Patent
Wessman et al.

(10) Patent No.: US 8,579,372 B2
(45) Date of Patent: Nov. 12, 2013

(54) REARWARD FACING INFLATABLE CHILD SEAT

(75) Inventors: Bjoern Wessman, Thousand Oaks, CA (US); Kolita Mendis, Redmond, WA (US); Robert Johnston, Vancouver (CA)

(73) Assignee: Volvo Car Corporation, Goeteborg (SE)

( * ) Notice: Subject to any disclaimer, the term of this patent is extended or adjusted under 35 U.S.C. 154(b) by 0 days.

(21) Appl. No.: 13/428,899

(22) Filed: Mar. 23, 2012

(65) Prior Publication Data

US 2012/0242128 A1 Sep. 27, 2012

(30) Foreign Application Priority Data

Mar. 23, 2011 (EP) .................................. 11159339

(51) Int. Cl.
*A47C 1/08* (2006.01)
*A47C 7/02* (2006.01)

(52) U.S. Cl.
USPC .................... 297/250.1; 297/452.41; 297/255

(58) Field of Classification Search
USPC ........................ 297/250.1, 254, 255, 452.41
See application file for complete search history.

(56) References Cited

U.S. PATENT DOCUMENTS

| 3,265,438 | A  | * | 8/1966  | Regan et al. ............. 297/452.41 |
| 4,627,659 | A  | * | 12/1986 | Hall .............................. 297/488 |
| 5,238,231 | A  | * | 8/1993  | Huang ............................ 267/35 |
| 5,292,176 | A  | * | 3/1994  | Artz ........................... 297/250.1 |
| 5,516,188 | A  | * | 5/1996  | Bruhnke et al. ............... 297/129 |
| 5,699,569 | A  | * | 12/1997 | Schwarz-Zohrer ............... 5/655 |
| 6,457,197 | B1 | * | 10/2002 | Wu ................................ 5/655.3 |
| 7,413,249 | B2 | * | 8/2008  | Leutert ......................... 297/237 |
| 7,658,153 | B1 | * | 2/2010  | Patoka ............................ 108/44 |
| 7,748,781 | B2 | * | 7/2010  | Bass .......................... 297/250.1 |
| 2009/0049752 | A1 | * | 2/2009 | Masuda .......................... 49/386 |

FOREIGN PATENT DOCUMENTS

| DE | 4204224 C1    | 7/1993  |
| DE | 10156621 C1   | 11/2002 |
| WO | 2004009399 A1 | 1/2004  |
| WO | 2006030048 A1 | 3/2006  |
| WO | 2009055954 A1 | 5/2009  |

* cited by examiner

*Primary Examiner* — Sarah B McPartlin
(74) *Attorney, Agent, or Firm* — Brooks Kushman P.C.

(57) ABSTRACT

The present invention relates to a child seat for rearward facing use in a vehicle. The child seat includes an inflatable seating cushion chamber; an inflatable back part chamber; and inflatable side part chambers. The chambers are interconnected such that they form a continuous inflatable volume that require only a single port for inflation and deflation. The chambers are constructed out of a non-permeable fabric that maintains a constant separation between at least two non-permeable fabric surfaces when inflated.

8 Claims, 8 Drawing Sheets

REARWARD FACING INFLATABLE CHILD SEAT

CROSS-REFERENCE TO RELATED APPLICATIONS

This application claims foreign priority benefits under 35 U.S.C. §119(a)-(d) to EP 11159339.8, filed Mar. 23, 2011, the disclosure of which is hereby incorporated by reference in its entirety.

TECHNICAL FIELD

The present application relates to a child seat for rearward facing use in a vehicle.

BACKGROUND OF THE INVENTION

Child seats as such are known. Apart from the safety and comfort for children, easy handling is an important feature. A child seat should be easy to install and remove and have a weight as low as possible, since the adjustment and movement of heavy objects in general in a passenger car is extremely awkward.

WO2006030048 relates to an inflatable child seat which can be fitted to the rear part of the seatback in a motor vehicle. The child seat can be affixed to the seatback in a plurality of ways including—but not limited to—belt straps that loop around the headrest and vehicle seat, or connect to an intermediate support brackets or directly integrated into the vehicle seat during manufacture. An intermediate support bracket is mounted to the backrest of the vehicle seat using fixing means comprising clamps, latches or belts that are positioned on the backrest or on the support bracket itself. Alternatively, the system of clamps and latches in the intermediate support bracket that accepts the child seat can be a permanent part of the vehicle seatback and integrated during the manufacture of the vehicle seat. Alternatively, the entire child seat can be a permanent part of the vehicle seatback and integrated during the manufacture of the vehicle seat. In addition, a box structure is removably-mounted to the aforementioned support with a fixing anchor, said box comprising a part which can rotate by means of hinges and a cover that rests on an area of the rear seat of the vehicle. In this way, when the seat is closed, the visible face thereof is aligned with the rear surface of the backrest. Moreover, the box contains a canvas surface which is built into the inner periphery of the box and the cover and which is equipped with a safety belt for the baby, such as to define a housing which is communicated with an air inlet for inflating the seat-forming canvas using air from an actuated compressor that is connected to the electric system of the vehicle, which is in turn controlled by an on/off control switch.

U.S. Pat. No. 7,413,249 relates to a pneumatic child seat that comprises a back part and a seating part. The child seat can be impinged upon by pressure from a pressure gas store after a closing element is opened. The child seat automatically unfolds from an opening in a back rest of a vehicle seat, changes into inflated shape and is disposed on the seat of a vehicle seat. The child seat essentially comprises a seating cushion and a back part, which are each produced from an envelope and ribs welded or glued therein. The envelope is gas-tight and can, for this purpose, be constituted for example by a PU film or a PU-coated, PU-laminated or PU-flocked textile material. The shape of ribs determines the cross-section of seating cushion or back part. If ribs are disposed U-shaped, a shell shape emerges in the presence of pressurization, if they are rectangular, board-like cushions emerge.

These prior art solutions, as described above, approximate flat surfaces using a series of interconnected surfaces of small curvature, which may cause discomfort to a child seated therein and also may have a negative effect on the stability of such a child seat.

Thus, there is a need for a stable, safe and comfortable child seat that, when not in use, may be stowed easily in a vehicle.

SUMMARY

One object of the application is to provide an improved child seat for rearward facing use in a vehicle.

In one embodiment a child seat comprises an inflatable seating cushion chamber; an inflatable back part chamber; inflatable side part chambers; wherein the chambers are interconnected such that they form a continuous inflatable volume that require only a single port for inflation and deflation; and the chambers are constructed out of a non-permeable fabric that maintains a constant separation between at least two non-permeable fabric surfaces when inflated, a stable, safe and comfortable child seat is achieved which may be folded into a rather compact package for easy stowage in a vehicle.

BRIEF DESCRIPTION OF THE DRAWINGS

In the following, the invention will be described in greater detail by way of example only with reference to attached drawings, in which.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

In overview, the present invention relates to a rearward facing inflatable child seat 1 for use in vehicles.

The inflatable child seat 1 is composed of one or more inflatable air chambers 2, 3, 4, 5 that are interconnected.

Figure 1:
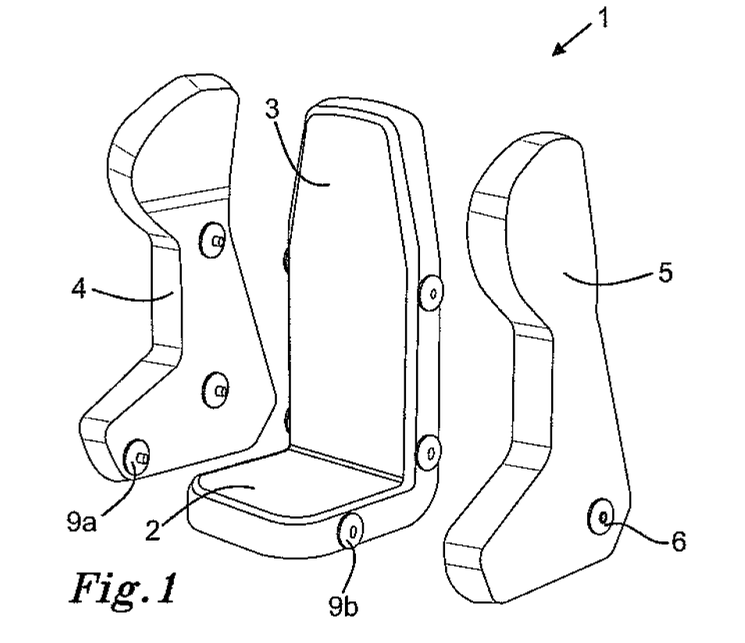
FIG. 1 is a schematic illustration of a first embodiment child seat in accordance with the present invention.

A first embodiment child seat 1, as illustrated in FIG. 1 comprises an inflatable seating cushion chamber 2 which is integrally formed with an inflatable back part chamber 3. Inflatable side part chambers 4, 5 provide sideward stability to a child using the child seat 1.

The chambers 2, 3, 4, 5 are interconnected such that they form a continuous inflatable volume that require only a single port 6 for inflation and deflation.

Figure 2:
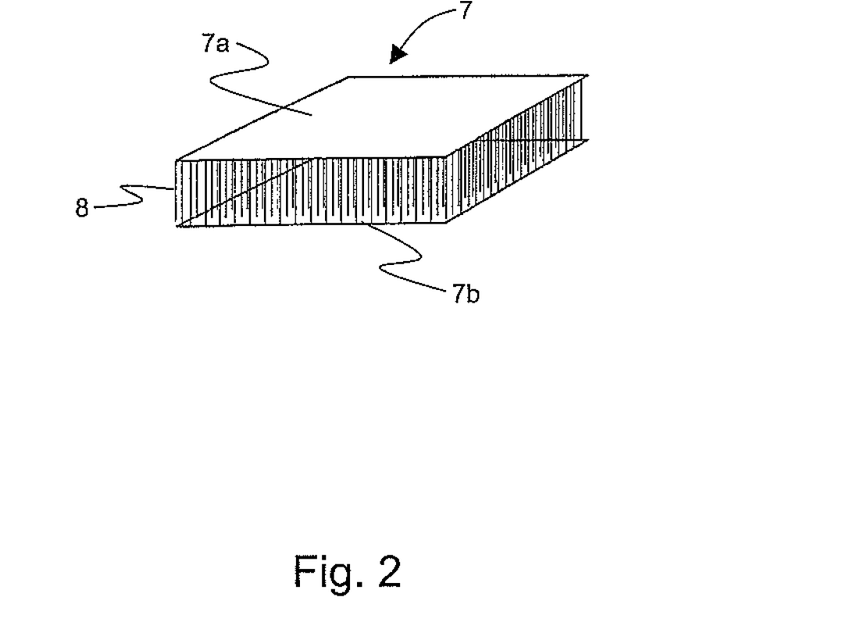
FIG. 2 is a cut-out section illustrating the construction of the drop-stitch fabric preferred for the present invention.

Further, in order to achieve air chambers 2, 3, 4, 5 having essentially flat sides where required, the chambers 2, 3, 4, 5 are constructed out of a non-permeable fabric 7 that comprises structure 8 for maintaining a constant separation between at least two non-permeable fabric surfaces 7a, 7b when inflated, as illustrated in FIG. 2.

It is proposed to use what is commonly called a "drop stitch fabric" or "drop stitch structure" 7 as the structure 8 for maintaining a constant separation in order to provide the basic structure of the inflatable child seat 1 of the present invention.

As shown in FIG. 2, the "drop stitch fabric" 7 comprises upper and lower non-permeable fabric layers 7a and 7b, with a core section positioned between, and connected to, the upper and lower non-permeable fabric layers 7a and 7b. This core section comprises a plurality of individual stitches, e.g. threads or cords 8, which have upper and lower end portions which connect to, respectively, the upper and lower non-permeable fabric layers 7a and 7b. The stitching 8 thus maintains a constant separation between the non-permeable surfaces 7a and 7b of the inflatable drop stitch fabric 7 when inflated.

Prior art solutions approximate flat surfaces using a series of interconnected surfaces of small curvature. Thus, in accordance with the present invention each air chamber 2, 3, 4, 5 is constructed out of drop-stitch fabric 7 which comprises two flexible non-permeable surfaces 7a and 7b that are spanned by a plurality of stitches 8 of fixed lengths. The stitching 8 thus, as stated above, maintains a constant separation between the non-permeable surfaces 7a and 7b when inflated, resulting in an air chamber 2, 3, 4, 5 that has essentially flat surfaces that do not curve outward.

Figure 3:
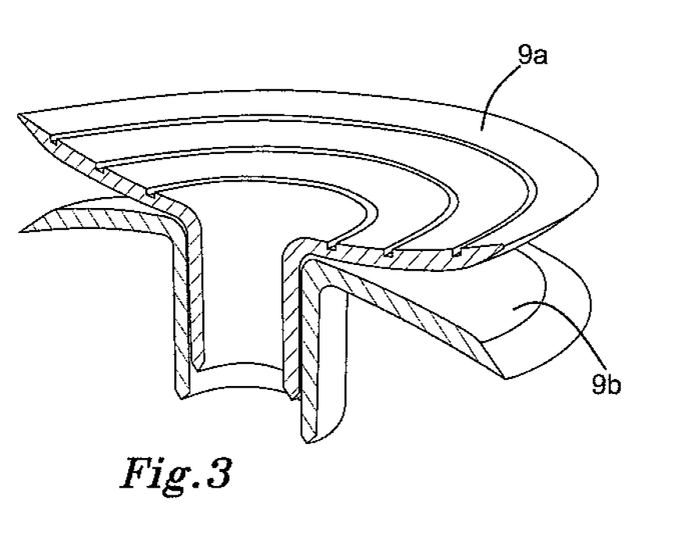
FIG. 3 illustrates grommets used for the first embodiment according to FIG. 1.

Interconnection between the one or more inflatable air chambers 2, 3, 4, 5 is in the first embodiment effected using hollow plastic grommets 9a and 9b as illustrated in FIG. 3. These grommets 9a and 9b are attached to each air chamber 2, 3, 4, 5 in a manner that allows the grommets 9a and 9b to snap fit and/or glue together to provide a continuous inflatable volume between the chambers 2, 3, 4, 5. The grommets 9a and 9b should preferably be thin walled, such that they are flexible with the fabric 7. Attachment surfaces for bonding to the fabric 7 should preferably be provided with ridges or similar structural elements in order to facilitate bonding between the grommets 9a and 9b and the fabric 7. The grommets 9a and 9b should always be paired to fit together to provide an unobstructed air passage between chambers 2, 3, 4, 5. Once the child seat in accordance with the first embodiment has been assembled the grommets 9a and 9b are essentially invisible to an external viewer. A series of air chambers 2, 3, 4, 5 thus connected require only a single port 6 for inflation and deflation.

Figure 8:
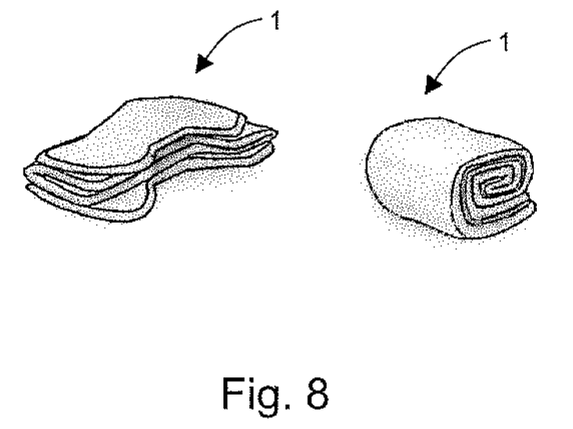
FIG. 8 illustrates how the child seat in accordance with the present invention may be folded into a rather compact package for easy stowage in a vehicle.

With the above described design the entire inflatable child seat 1 can be inflated and deflated through a single port or air valve 6. Thus, when inflated, the pressure through the inflatable child seat 1 places the structure in an operating mode where it is a substantially rigid structure. Then, when it is deflated, the child seat can be folded into a rather compact package for easy stowage in the vehicle, as illustrated in FIG. 8.

Figure 4:
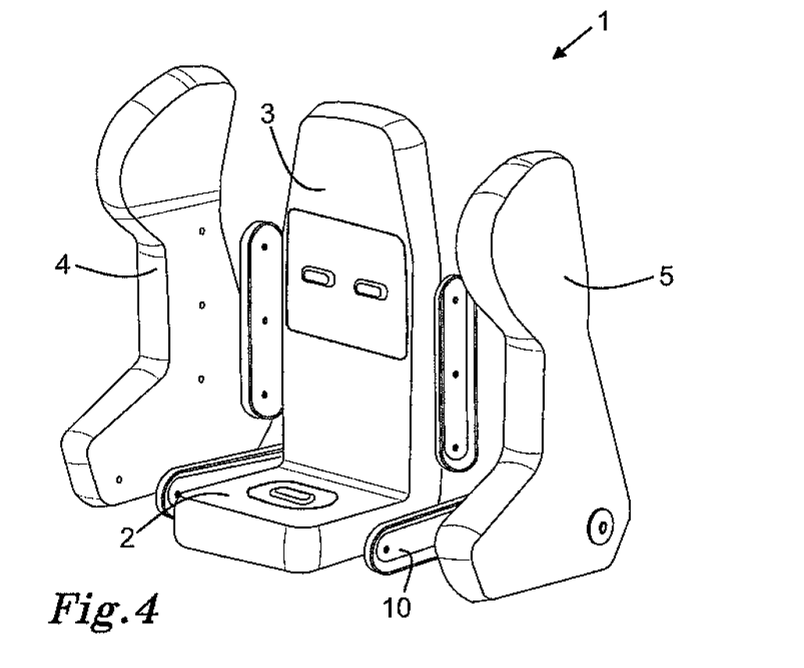
FIG. 4 is a schematic illustration of a second embodiment child seat in accordance with the present invention.

In an alternative second embodiment, as illustrated in FIG. 4, interconnection between the one or more inflatable air chambers 2, 3, 4, 5 is effected by air connection patches 10, which are bonded to each air chamber 2, 3, 4, 5 to provide a continuous inflatable volume between the chambers 2, 3, 4, 5. A series of chambers 2, 3, 4, 5 connected in this alternative manner likewise require only a single port 6 for inflation and deflation.

Figure 5:
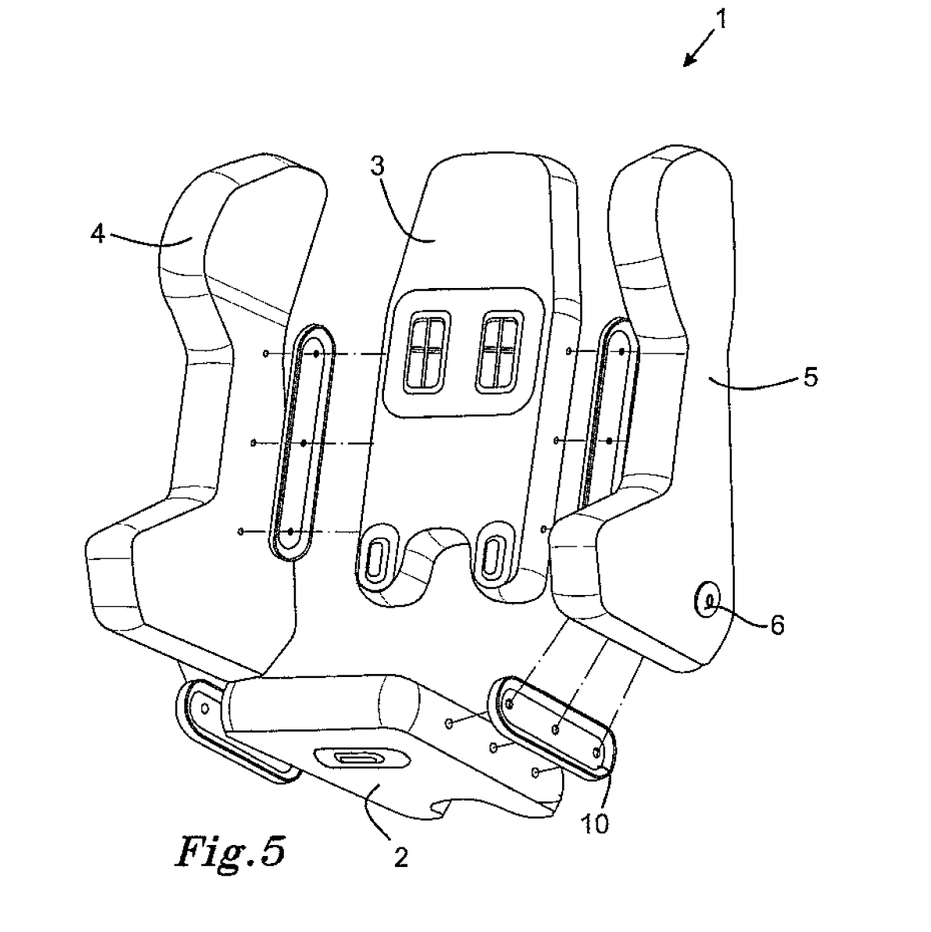
FIG. 5 is a schematic illustration of a third embodiment child seat in accordance with the present invention.

In an alternative third embodiment, as illustrated in FIG. 5, the inflatable seating cushion chamber 2 is formed separately from the inflatable back part chamber 3.

Figure 6:
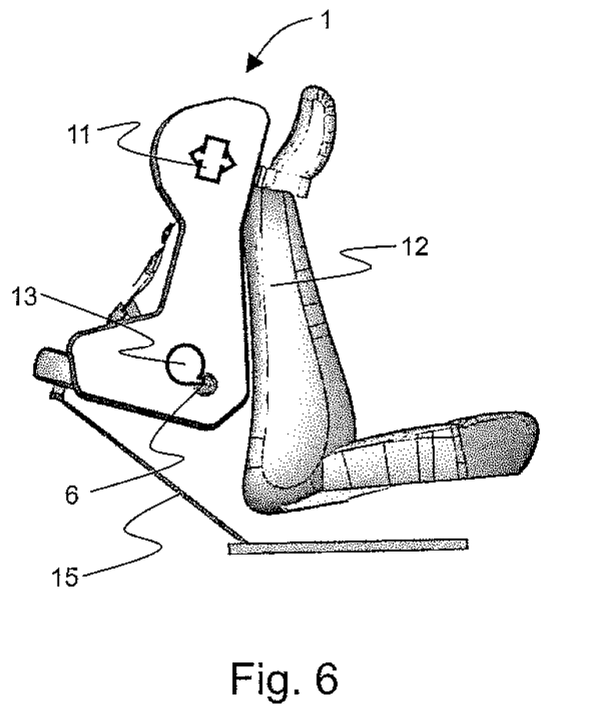
FIG. 6 is a schematic side view of a child seat in accordance with the present invention mounted to a vehicle seatback.
Figure 7:
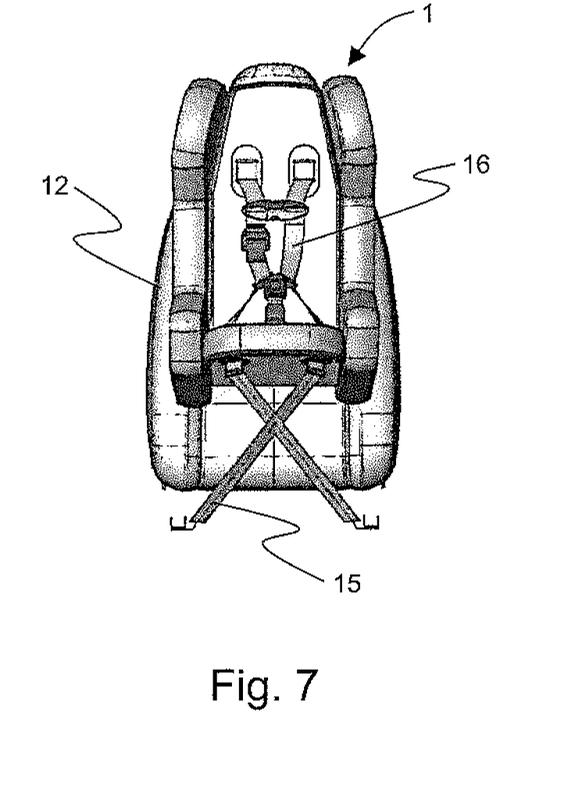
FIG. 7 shows the child seat of FIG. 6 in a rear view.

The inflatable child seat 1 may be secured to a vehicle seat aft of the seatback 12 thereof, as illustrated in FIGS. 6 and 7. The inflatable child seat 1 provides a rearward facing position for a child when attached in this manner to a forward facing vehicle seat.

An inclinometer 11 may be attached to the inflatable child seat 1, in order to facilitate adjustment of the vehicle seatback 12 to an appropriate angle for securing the inflatable child seat 1.

The inflatable child seat 1 may alternatively be secured to the vehicle seat in a customary manner by placing it upon the vehicle seat cushion, not shown. The inflatable child seat 1 provides a forward facing position for a child when attached in this manner to a forward facing vehicle seat.

The inflatable child seat 1 may be attached to the vehicle seat using appropriate belt harnesses and/or by means of standardized ISOFIX attachments (not shown).

If the inflatable child seat 1 is secured to the vehicle seat by means of a series of belts, in a rearward facing configuration, the inflatable child seat 1 is slung behind the vehicle seat back 12 by means of a belt loop. This belt loop may or may not contain a tightening buckle, which is secured around the front seatback's headrest. Further, the inflatable child seat 1 may comprise a plurality of belts 15, which emanate from the bottom of the inflatable child seat 1, and which belts 15 are provided with appropriate latches for connecting to securing hooks in the vehicle seat frame or door.

In the absence of securing hooks in the vehicle seat frame or floor a short loop of belt, with a buckle and an attached ring, may be provided to loop around any available structure in the vehicle, such as a seat. It may be strapped tightly thereto, and thus allow the belt latches of the inflatable child seat 1 to connect to the ring.

The inflatable child seat 1 may also be used in a forward facing position by routing the vehicle seat belt (not shown) through an appropriate path in the child seat and/or by means of standardized ISOFIX attachments.

Harness straps 16 are routed through or attached to objects that are bonded to the surface of the inflatable child seat 1. The seated child is thus connected to the inflatable child seat 1 with an appropriate belt harness 16.

The inflatable child seat 1 may be inflated by manual means, e.g. using a mechanical pump, or a motorized inflator. Such a motorized inflator or pump 13, preferably electric, may be integrated into the inflatable seat, as illustrated in FIG. 6. It may of course also be a discrete device separate therefrom.

The invention is not limited to the above-described embodiments, but may be varied within the scope of the following claims.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A child seat for use in a vehicle comprising:
   an inflatable seating cushion chamber having a left grommet and a right grommet;
   an inflatable back part chamber having a left grommet and a right grommet;
   a left inflatable side part chamber having an upper grommet detachably connectable with the left grommet of the back part chamber and a lower grommet detachably connectable with the left grommet of the seating cushion chamber; and
   a right inflatable side part chamber having an upper grommet detachably connectable with the right grommet of the back part chamber and a lower grommet detachably connectable with the right grommet of the seating cushion chamber;
   wherein each chamber comprises a drop-stitch structure having two substantially parallel flexible layers connected by a plurality of stitches of fixed length maintaining a constant separation between the two flexible layers, and wherein the grommets are hollow such that the connections between each pair of detachably connectable grommets provide fluid interconnections between the seating cushion chamber, the back part chamber, and the left and right side part chambers such that they form a continuous volume that is inflatable and deflatable using a single port located on any one of the chambers.

2. A child seat according to claim 1 wherein at least one two of the detachably connectable grommets are joined to one another by a snap fit engagement to provide a continuous inflatable volume between the chambers.

3. A child seat according to claim 1 wherein at least one detachably connectable pair of grommets are attached to the respective chambers in a manner that allows the grommets to be glued together to provide a continuous inflatable volume between the chambers.

4. A child seat according to claim 1 wherein at least one detachably connectable pair of grommets are attached to the respective chambers in a manner that allows the grommets to snap fit and be glued together to provide a continuous inflatable volume between the chambers.

5. A child seat according to claim 1 wherein an inclinometer is attached to the child seat so that a vehicle seatback may be adjusted to an appropriate angle for securing the child seat thereto.

6. A child seat according to claim 1 wherein a pump for inflating thereof is integrated to the child seat.

7. A child seat according to claim 1 further comprising standardized ISOFIX attachments for being attached to a vehicle seat.

8. A child seat according to claim 1 further comprising belt harnesses for being attached to a vehicle seat.

* * * * *

UNITED STATES PATENT AND TRADEMARK OFFICE
CERTIFICATE OF CORRECTION

| | | |
|---|---|---|
| PATENT NO. | : 8,579,372 B2 | Page 1 of 1 |
| APPLICATION NO. | : 13/428899 | |
| DATED | : November 12, 2013 | |
| INVENTOR(S) | : Bjorn Wessman et al. | |

It is certified that error appears in the above-identified patent and that said Letters Patent is hereby corrected as shown below:

In the Claims

Column 6, Line 5, Claim 2:

After "wherein at least"
Delete "one".

Signed and Sealed this
Eighth Day of April, 2014

Michelle K. Lee
*Deputy Director of the United States Patent and Trademark Office*